United States Patent [19]
Rose

[11] Patent Number: 5,299,227
[45] Date of Patent: Mar. 29, 1994

[54] INDIVIDUAL BEACON IDENTIFICATION SYSTEM

[75] Inventor: David Rose, Bowie, Md.

[73] Assignee: American Electronics, Inc., Lanham, Md.

[21] Appl. No.: 45,186

[22] Filed: Apr. 13, 1993

[51] Int. Cl.$^5$ ............................ H04K 1/00; H04L 9/00
[52] U.S. Cl. .......................................... 375/1; 342/45; 340/825.54; 340/825.34; 340/825.44
[58] Field of Search ................ 375/1; 342/45; 380/23; 343/6.5 R; 340/825.54, 825.34, 825.44

[56] References Cited

U.S. PATENT DOCUMENTS

| | | | |
|---|---|---|---|
| 3,104,478 | 9/1963 | Strauss et al. | 35/25 |
| 3,227,882 | 1/1966 | Bissett et al. | 250/199 |
| 4,048,563 | 9/1977 | Osborne | 375/1 |
| 4,081,669 | 3/1978 | Klingman, III | 250/199 |
| 4,099,050 | 7/1978 | Sauermann | 250/199 |
| 4,134,008 | 1/1979 | de Corlieu et al. | 250/199 |
| 4,170,757 | 10/1979 | Skudera et al. | 375/1 |
| 4,203,667 | 5/1980 | Pierce et al. | 356/152 |
| 4,249,265 | 2/1981 | Coester | 455/604 |
| 4,325,146 | 4/1982 | Lennington | 455/604 |
| 4,361,911 | 11/1982 | Buser et al. | 455/605 |
| 4,814,742 | 3/1989 | Morita et al. | 340/825 |
| 4,814,769 | 3/1989 | Robin et al. | 342/45 |
| 4,837,568 | 6/1989 | Snaper | 340/825 |
| 4,995,101 | 2/1991 | Titterton et al. | 455/607 |
| 5,001,488 | 3/1991 | Joquet | 342/45 |
| 5,142,288 | 8/1992 | Cleveland | 342/45 |

OTHER PUBLICATIONS

Curtis, Nonimaging Identification Structure, Sep. 1, 1987, Statutory Invention Registration No. H333.

*Primary Examiner*—David C. Cain
*Attorney, Agent, or Firm*—Thomas M. Champagne; Jon L. Roberts

[57] ABSTRACT

A compact beacon-detector type IFF system to be carried by individual soldiers. The system consists of a beacon and a special purpose detector. The beacon is a small, light-weight, battery powered device that is worn on the soldier's web gear. The detector consists of a small flashlight-like device that can be hand held or mounted on a weapon, similar to a rifle scope. The beacon's signal is not visible to those using existing night vision equipment nor is it otherwise exploitable by a potential adversary. The system achieves its covertness through the selection of the optical wavelength used by the beacon. Further signature reduction is achieved through the use of a Low Probability of Intercept ("LPI") spread spectrum waveform as the beacon output. This waveform utilizes a spreading code to encode the beacon output signal. Even if an enemy has a sensor capable of detecting the proper optical wavelength, it would not be able to detect or emulate the beacon's signal without prior knowledge of the specific spreading code used. The detector of the present invention is designed to despread the beacon output waveform, allowing the signal to be detected. This spread/despread code can be changed as frequently as required, so that capture of the beacon or detector would not be a serious risk to compromising the system.

30 Claims, 3 Drawing Sheets

INDIVIDUAL BEACON IDENTIFICATION SYSTEM

FIELD OF THE INVENTION

The present invention relates generally to a system for identifying the location of and/or distinguishing between friendly or unfriendly entities (Identification, Friend or Foe, or "IFF") for use in military or civilian contexts. In particular, the present invention is an IFF system wherein the friendly personnel or objects carry continuously transmitting pulse-coded output beacon transmitters, and those wishing to distinguish friend from foe carry a specially designed detector which will detect the friendly beacon output signal.

BACKGROUND OF THE INVENTION

The recent instances of death and injury of soldiers by "friendly fire" during Operation Desert Storm has all too poignantly stressed the need for the armed services to be able to accurately and rapidly identify those forces friendly to them. An accurate system of friendly force identification could have easily avoided much of the bloodshed from such unfortunate accidents.

Recent advances in surveillance technology have created a necessity for better systems for distinguishing friend from foe. In military applications, military aircraft and shipboard and ground stations are equipped with sophisticated radar systems which can detect the presence of other aircraft in its general vicinity long before anyone at the radar site can make a visual identification. The capability also exists at these radar sites, or at the command of the radar sites, for firing weapons at a radar target. In a combat context, there is a great need to make the earliest possible friend or foe determination of the detected aircraft. If the aircraft is fired upon before identification is made, there is a chance that friendly aircraft will be shot down. If too much time passes before a friend or foe determination is made, there is a chance of being attacked by enemy aircraft.

As previously stated and as illustrated by Desert Storm statistics, there is also a need for IFF capability for individual soldiers on combat missions. When numerous soldiers are deployed in territory in which there is a good chance that enemy soldiers will be present also, the opportunity for fratricide is great. A soldier who fires at any movement in a cotabat environment risks shooting friendly personnel. However, waiting until a positive visual identification is made puts the soldier at risk himself. This is particularly critical at night and in inclement weather, when visibility is accurate over a shorter distance. An IFF system for individuals is needed to avoid injury and death due to friendly fire. This system must be equally effective both during the day and at night, and also during adverse weather conditions. Because the system will be carried by an individual, it must be compact, lightweight, and easy to activate and deactivate. Such an IFF system would also be useful in signalling applications, such as in locating personnel downed in enemy territory.

Numerous IFF-type systems are known which are adapted for a variety of uses. Many of these systems involve an interrogator and a transponder. The interrogator "challenges" a person or vehicle with a coded signal. A friendly target having a transponder will recognize the coded signal as a challenge, or interrogation, and will transmit a properly coded reply to the interrogator. The interrogator will recognize the reply as friendly, and the user will act accordingly. An unfriendly target, or foe, will not recognize the coded interrogation, and will therefore not respond. The interrogator, upon receiving no reply after waiting a predetermined amount of time, will indicate to the user that the target is unknown and presumed hostile, and the user will act accordingly.

Such a system is disclosed in U.S. Pat. No. 4,814,769, issued to Robin et al. This is a classic IFF system utilizing an interrogator and a transponder. Other such systems are disclosed in U.S. Pat. No. 3,104,478 to Strauss et al., U.S. Pat. No. 4,814,742 to Morita et al., U.S. Pat. No. 4,837,568 to Snaper, U.S. Pat. No. 4,099,050 to Sauermann, U.S. Pat. No. 4,249,265 to Coester, U.S. Pat. No. 4,134,008 to de Corlieu et al., U.S. Pat. No. 4,325,146 to Lennington, U.S. Pat. No. 4,361,911 to Buser et al., U.S. Pat. No. 4,995,101 to Titterton et al., U.S. Pat. No. 5,001,488 to Joguet, and U.S. Pat. No. 5,142,288 to Cleveland. These systems all include an interactive transponder. That is, the transponder only transmits a reply when it senses an interrogation. At all other times, no output signal issues from the transponder.

This type of interactive system is advantageous in keeping the communication between friendly entities secure. During the time that the transponder does not output a signal, unfriendly observers cannot detect the transponder's presence. However, transponders that are not interactive, that is, those that continuously transmit, have much more simple designs. A continuously transmitting transponder, or beacon, only requires a transmitter. An interactive transponder requires a receiver f or the incoming interrogation, signal decoding and recognition circuitry and signal generation circuitry for the reply in addition to the transmitter. A beacon-type transponder requires a less expensive design, is less expensive to build, is more reliable due to the less complicated design, and can be designed in a smaller package. The interrogator making up part of a system using a beacon transponder would employ a simpler design as well. The interrogator need only be a detector in this case, as only a receiver and signal recognition circuitry would be required. If designed properly, an IFF system comprising a beacon and a detector can also provide the security manifest in the interactive type transponder.

U.S. Pat. No. 3,227,882, issued to Bassett et al. discloses a beacon and detector type signalling system. The output of the beacon is coded, but the coding is not used to verify the reply; the detector interprets the coded reply word to elicit information. U.S. Pat. No. 4,081,669 to Klingman, III discloses a recognition is system for robots. Beacons are placed on numerous objects and a robot is equipped with an optical detector. The beacon outputs are coded so that the robot can identify the objects. U.S. Statutory Invention Registration No. H333 to Curtis discloses an infrared beacon on a target vehicle, along with a special purpose receiver on a surveillance vehicle. Different filters may be used on the beacon to change the output frequency within the infrared range. The pulse repetition rate of the output signal may also be changed. The surveillance vehicle then recognizes as friendly any vehicle emitting a signal having the predetermined wavelength and pulse rate.

The preceding inventions do not take full advantage of the size and money saving advantages of the beacon-detector type IFF system, nor do they provide the security necessary for modern military applications. The most sophisticated coding method in the previous references, that used in the Curtis invention, is too easily corruptible using today's military technology. The beacon signal transmitted at any one time has a constant wavelength and a constant pulse repetition rate. Anyone with a detector sensitive to the particular frequency used will immediately recognize the pulse rate. The beacon output signal would then be too easy to detect and mimic by unfriendly observers. Also, the unit's size would make it suitable only for use with vehicles, being too cumbersome to be carried by individual personnel who need covert identification means on the battlefield.

Recently, a series of field tests were conducted by the U.S. Army Infantry School on various soldier identification systems in order to determine their utility as a means to prevent fratricide when employed by dismounted soldiers. One of these devices consisted of a near infrared (0.88 micrometer wavelength) light emitting diode ("LED") connected to a 9 volt battery and flashed at about 2 Hz. This wavelength is invisible to the naked eye, but falls within the responsivity range of current image intensifier ("$I^2$") type detector devices.

The tests demonstrated that the system, when worn on a soldier's web gear and viewed from the front or side, was visible at ranges up to 1500 meters through currently fielded $I^2$ equipment. When viewed from the rear, with the light obscured by the soldier's body, the device was detectable intermittently to 1500 meters, and was clearly visible to all, both friend and foe, up to a range of 700 meters (500 meters in the woods). Furthermore, if a soldier were standing near shrubbery, in a foxhole, or behind some object, enough infrared radiation was scattered from leaves, other nearby surfaces, or particles in the air that a "halo" was created that generally increased the device's signature. This provided a limited non-line of sight capability, and accounts for the visibility of the system's beacon from any angle, even when obscured by the soldier's body.

The tests therefore demonstrated that the system functioned as an ideal individual soldier identification device, but was too easily exploitable by potential adversaries. The frequency chosen and lack of adequate coding made it too susceptible to detection by imaging systems such as night vision equipment. For this reason, the system is not suitable for use in assisting the recognition of friendly dismounted troops or vehicles in a situation where security could be compromised.

SUMMARY OF THE INVENTION

It is therefore an object of the present invention to provide an individual beacon identification system that is undetectable and not exploitable by the enemy.

It is a further object of the present invention to provide an individual beacon identification system that is effective at ranges of 400 meters or greater.

It is another object of the present invention to provide an individual beacon identification system that is detectable from all angles by friendly detectors.

It is also an object of the present invention to provide an individual beacon identification system that is effective both day and night.

It is yet another object of the present invention to provide an individual beacon identification system that is effective in adverse weather and over all types of terrain.

It is still a further object of the present invention to provide an individual beacon identification system that is easily activated and deactivated by the user.

It is a further object of the present invention to provide an individual beacon identification system in which the transmitter weighs less than 3 ounces.

It is another object of the present invention to provide an individual beacon identification system that can be fully integrated into a soldier's combat uniform.

It is also an object of the present invention to provide an individual beacon identification system that employs a simple, reliable design.

It is yet another object of the present invention to provide an individual beacon identification system that enables a large number of coding options.

It is still a further object of the present invention to provide an individual beacon identification system that has nonline of sight capability.

It is another object of the present invention to provide an individual beacon identification system that can operate for over 24 hours on one 9 volt battery.

It is a further object of the present invention to provide an individual beacon identification system that is flexible enough to use in a variety of situations where similar objects exist to discriminate those designated for or belonging to different entities.

These and other options and advantages of the present invention will be apparent to those skilled in the art after inspection of the detailed description, drawings, and appended claims.

The present invention is a compact beacon-detector type IFF system designed to be carried by individual soldiers. The invention is also designed not to be visible to those using existing night vision equipment or be otherwise exploitable by a potential adversary. The system consists of a beacon and a special purpose detector. The beacon is a small, light-weight, battery powered device that is worn on the soldier's web gear (the means by which soldiers carry their equipment). The beacon is attached to the soldier's web gear by a clip or other attachment means such as straps, snaps, buttons, or VELCRO ™ hook and loop fasteners. The detector consists of a small flashlight-like device (although other configurations are possible) that can be hand held or mounted on a weapon, similar to a rifle scope.

The system achieves its covertness through the selection of the optical wavelength used by the beacon and through the use of a spread spectrum output signal. The spread spectrum output is generated by modulating the beacon output with a pseudorandom sequence. An observer that is not equipped with the proper detector and signal despreader would not be able to distinguish the coded beacon signal above the internal noise generated by the detector in its own receiver.

Further, signature reduction is achieved through the use of a Low Probability of Intercept ("LPI") spread spectrum waveform as the beacon output. This waveform utilizes a spreading code to encode the beacon output signal. This means that even if an enemy has a sensor capable of detecting the proper optical wavelength, it would not be able to detect or emulate the beacon's signal without prior knowledge of the specific spreading code used. The detector must be capable of despreading the waveform before the beacon output can be detected. The detector of the present invention is designed to despread the beacon output waveform, allowing the signal to be detected. This spread/despread code can be changed as frequently as required, so that capture of the beacon or detector would not be a serious risk to compromising the system.

While a battlefield application is immediately apparent, other uses of the invention are also contemplated. For example, such units attached to shipping containers would allow all of the particular company's trailers to be identified in a yard filled with such containers.

Likewise, cars or other cargo designated for a particular shipper or dealer can be easily identified in a lot containing thousands of other cars or cargo. Likewise, inventory in a warehouse may be quickly located using the identification system of the present invention. Nearly every situation in which many similar objects are commingled, only some of which belong to or are designated for a particular party, can benefit from the use of this identification system.

DETAILED DESCRIPTION OF THE PREFERRED EMBODIMENT

Figure 1:
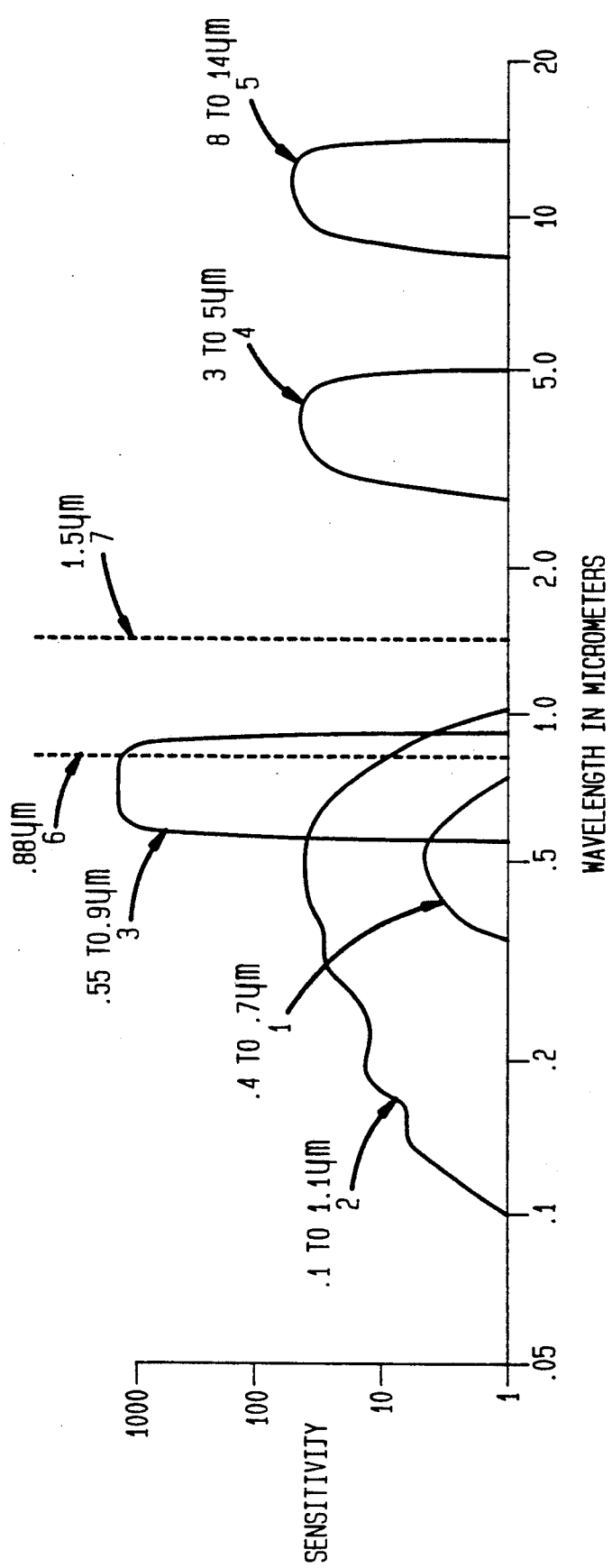
FIG. 1 shows the spectral responsivity of current imaging systems, including that of the present invention.

FIG. 1 shows the spectral responsivity of currently used imaging devices. As a reference, the portion of the electromagnetic spectrum 1 that is visible to the human eye is shown at approximately 0.4 to 0.7 micrometers. $I^2$ type detectors utilize the portions of the spectrum 2 and 3 falling between 0.1 to 1.1 micrometers or 0.55 to 0.9 micrometers. Thermal imagers are designed to detect signals falling in the ranges 4 and 5 of 3 to 5 micrometers or 8 to 14 micrometers. The frequency 6 transmitted by the U.S. Army Infantry School beacon during their recent field tests is shown at 0.88 micrometers. It can be seen that this frequency 6 falls within the responsivity ranges 2 and 3 of currently fielded $I^2$ equipment.

The 1.5 micrometer wavelength 7 utilized in the preferred embodiment of the system of the present invention falls well outside the responsivity ranges of both $I^2$ devices 2 and 3 and thermal vision systems 4 and 5, making it invisible to anything currently in use on the battlefield. In addition, this wavelength has good atmospheric propagation characteristics, avoiding major water and air absorption lines and having relative immunity to scattering. This wavelength will penetrate anything the soldier can see through, and many things he cannot see through.

Figure 3:
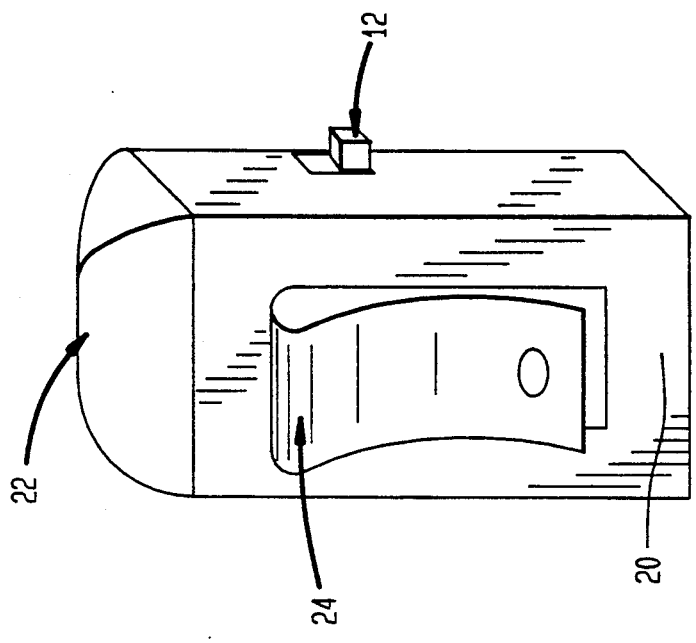
FIG. 3 shows an exterior rear view of the beacon.
Figure 2:
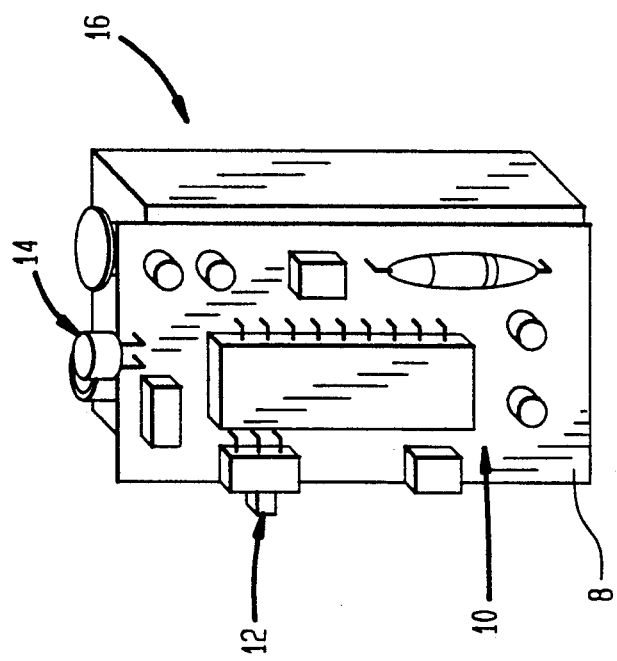
FIG. 2 shows an interior front view of the beacon.

As shown in FIG. 2, the infrared beacon light emitting means comprises a small printed circuit board 8 on which electronics 10, a power switch 12, and a laser diode 14 are mounted. The electronics 10 generate an electrical signal output to drive the laser diode 14. The laser diode 14 is used in the preferred embodiment. Other means, such as a high-powered light emitting diode ("LED"), or gas or crystal laser, may be utilized in the beacon design. The laser diode 14 or other means accepts this electrical signal as an input and produces the infrared beacon output according to the amplitude and duration of the electrical signal. The beacon is powered by a standard top-terminal 9 volt battery 16 attached to the circuit board 8, and is mounted in a small, rugged enclosure 20. As shown in FIG. 3, the laser diode 14 will be covered with a diffusing filter 22 that spreads the emitted infrared radiation into a relatively uniform pattern. The enclosure 20 also protects the diode 14 and other electronic components 10 from shock, moisture, and dirt. The entire unit is about the same size as a standard commercial paging device. The beacon can be mounted anywhere on the soldier's clothing or equipment (the web gear). The embodiment shown in FIG. 3 includes a clip 24 for attaching to the soldier's web gear, but other means of attachment are possible.

The beacon transmits continuously when the power switch 12 is turned on, and operates for more than 24 hours on a single battery 16. The entire device (including the battery 16) weighs approximately 3 ounces, and is approximately twice the size of the battery 16 alone.

No individual pulse transmitted by the beacon contains enough energy to be detected above the inherent noise in the detector. However, by integrating over a large number of pulses at the detector, a strong signal can be detected. Such integration is provided by electronics 36 (FIG. 4) in the detector and requires prior knowledge of the pulse pattern, which is what gives the signal its LPI characteristics.

The beacon is visible from all angles, even when a direct line of sight path from beacon to detector is obscured by the soldier's body or equipment. Radiation from the beacon will reflect off parts of the soldier, nearby objects, and particulates in the air to create a "halo" effect that is visible from any direction. The tendency of the optical signal to scatter and reflect off nearby objects and airborne particulates also results in the ability to detect the beacon when the direct line of sight path from detector to beacon is blocked by some other object or by the terrain. This feature makes friendly soldiers detectable even if they are behind trees or foliage, in a foxhole, or just around a corner or doorway. This secondary scattering is limited to objects within a few feet of the soldier, so it is unlikely that enemy soldiers would be mistakenly identified as friendly even when friends and foes are intermixed.

The 1.5 micrometer wavelength will penetrate any obscurants, such as smoke, rain, or dust, that the soldier can see through. In most cases, such obscurants may actually increase the signature of the beacon by increasing the halo of scattered radiation.

While the 1.5 micrometer wavelength is most effective in combat situations, other wavelengths may be used in non-tactical applications. In the inventory tagging and shipping identification situations mentioned previously, it is not necessary to prevent detection of the beacon signal by enemies. In these applications, near infrared, visible, or ultraviolet wavelength beacon signals may be used, and in fact, a near infrared (approximately 0.8 to 0.9 micron wavelength) or visible wavelength beacon would probably be less expensive to implement than would the 1.5 micron, mid-infrared wavelength used in combat situations.

Most of the electronics 10 required for the operation of the beacon can be incorporated into a single application specific integrated circuit ("ASIC"). The ASIC, circuit board 8, laser diode 14, battery 16, enclosure 20, and discrete electronic 13 components 10 are constructed in a unit that weighs less than 3 ounces. The beacon is activated and deactivated merely through the use of the power switch 12.

Figure 4:
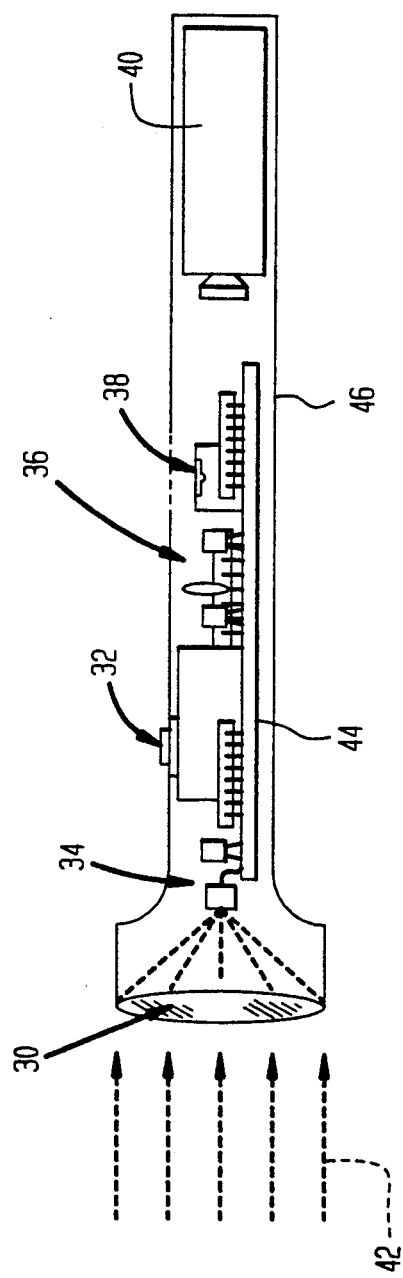
FIG. 4 shows the detector.

The detector shown in FIG. 4 is approximately 7 inches long, and has a lens 30 of approximately 1½ inches diameter which includes the 1.5 micrometer infrared filter. The actual discrete detector 34 circuit component is located directly behind the lens. A power switch 32 is located on the top as shown. This power switch 32 is all that is necessary for the user to activate and deactivate the detector. Aiming the detector at a correctly coded beacon causes a tone to sound in the detector. The tone gets louder as the beacon is centered in the detector's field of view. Thus, it is possible to search a large area very quickly for the presence of friendly troops by scanning the detector back and forth over the area in question, and still allow pinpoint accuracy by listening for peaks in the audio signal. This technique is similar to manually tuning in a radio station or locating an object with a metal detector. The detector allows the position of friendly troops to be determined to within two to four degrees, out to the maximum range of the device.

The electronic components 36 which enable the detector to function as described above are mounted on a printed circuit board 44 located inside the detector housing 46. The discrete detector 34, power switch 32, and tone generator 38 are also mounted on the circuit board. The battery 40 providing power to the detector may be located toward the rear of housing 46. The incoming signal 42 from the beacon first passes through lens 30 and impinges on detector 34. The lens 30 will filter incoming electromagnetic radiation, passing only 1.5 micrometer infrared light. The detector 34 converts incoming radiation to an electrical signal of an amplitude commensurate with the infrared signal strength. The electrical signal is then passed to the electronics 36, which despreads the signal and integrates the resulting pulses over time, is producing an output signal for the tone generator 38. If the output signal has a sufficient amplitude, indicating a beacon signal detection, the tone generator 38 will sound. As the beacon signal 42 gets stronger, the output signal produced by the integration performed by the electronics 36 will gain in amplitude, causing the tone generator 38 to produce a stronger tone.

As with the beacon, most of the electronics 36 required for the operation of the detector can be incorporated into a single ASIC.

The preferred embodiment of the detector as shown in FIG. 4 is a small flashlight-like device that can be hand held or mounted on a weapon, similar to a rifle scope. The detector may be configured in other shapes and designed into a different type of enclosure, however, so long as the necessary components are part of the overall design.

The audible tone is only one possible method of signalling the presence of a beacon. Other methods may include using a flashing light emitting diode ("LED"), a low frequency tactile vibration, or a combination of the above.

There are a number of commercially available laser diodes and detectors that are suitable for use with the present invention. For example, EG&G Optoelectronics sells a laser diode ("the EG&G diode"), part number C86045EV1, that transmits a 1.5 micro-meter signal at a peak output power of 500 milliwatts, drawing 3 amperes of peak current. EG&G Optoelectronics also offers an avalanche photodiode detector ("the EG&G detector"), part number C30662BL, with a responsivity of 7.5 amperes per watt at 1.5 micrometers that is suitable for use as the discrete detector 34 in the detector unit of the present invention.

The particular laser diode referenced above can generate enough optical signal to be detectable at ranges of over one kilometer by the above referenced detector, if operated at maximum power, and has the peak pulse power and high rise time required to support a spread spectrum waveform. The output power of the EG&G diode can be adjusted to have a reliable range of 400 meters when used with the EG&G detector. This is a sufficient range for combat situations, and results in an increase in battery life compared with that experienced under maximum power use. A beacon using the EG&G diode set for a 400 meter range has an average current draw of about 10 milliamperes. Since a typical top terminal 9 volt battery has a capacity of approximately 400 milliamperes per hour, this beacon will operate for up to 40 hours on a single battery.

An advantageous feature of this diode is that it is eye safe at all ranges, and so has no special handling or safety related precautions associated with its use.

The key specification for the EG&G detector is its noise equivalent power, which is the amount of optical signal power that must be focussed on the detector to equal the inherent internal detector noise. The figure given by the manufacturer, 0.13 picowatts of optical power per square root of bandwidth, is about the same as that of a third generation image intensifier. Currently fielded detectors therefore have no advantage over the detector of the present invention in this respect. The EG&G diode/detector pair is easily capable of operating at ranges exceeding 400 meters. Other diode/detector pairs may allow reliable operation at even greater distances, permitting air-to-ground and other longer distance applications.

Using the appropriate narrowband optical filters in the lens 30 of the detector unit, the increased background noise caused by solar radiation during the day will not have a major effect on useful detection range. As a worst case, it may be necessary to include a day/night switch on the beacon that increases radiated power slightly during the day to compensate for the increased noise floor.

Both the beacon and the detector are entirely solid state, and have a very high mean time between failures ("MTBF"), on the order of tens of thousands of operating hours. The system is intuitive and simple to operate, requiring very little user training.

As previously noted, the system of the present invention utilizes a spread spectrum waveform. Spread spectrum waveforms in radio frequency systems are almost exclusively one of two types. The first is a direct sequence spread spectrum, in which each data bit is divided into multiple "chips" and phase modulated with a pseudorandom code. The other type is a frequency hopping spread spectrum, in which the carrier frequency of the signal is changed very rapidly according to a pseudorandom sequence. Neither of these techniques lends itself to an optical communications application. A direct sequence system requires coherent detection, which is not practical for a small, low cost optical system. Frequency hopping requires the ability to tune both the laser diode transmitter and the optical filter in the detector. This is marginally feasible for a large, vehicle mounted system weighing several pounds, but beyond the state of the art for a portable device to be used in large quantities in the field.

The spread spectrum waveform utilized by the system of the present invention is a pulse position code. This technique employs a series of very short pulses transmitted according to a predetermined pseudorandom time sequence. The pseudorandom sequence generator ("PRSG") used to provide the spreading function in the beacon is designed into the electronics 10 and may be included in the ASIC. PRSGs of this type are well known to those skilled in the art of electronics. The most common PRSGs use common digital registers and XOR gates to generate the sequence.

Code selection by the user is accomplished in two ways. First, a dual in-line package ("DIP") switch or other control can be designed into the beacon and mounted on the printed circuit board 8 to allow the user to set and change the spreading code. Alternatively, the code can be stored in a memory means, for example a chip (such as an EEPROM, RAM, UVEPROM, or similar device). The code can be changed by unplugging and replacing the chip on the printed circuit board 8 or by downloading a new code (reprogramming) from some external device through, for example, an RS-232 serial port. Using either method, thousands of different codes are possible and the system can be repeatedly changed from one code to another.

The detector utilizes the same PRSG design as part of its electronics 36. In the detector, the PRSG enables the despreading of the detected signal. A DIP switch or memory means in the detector changes the code as needed in order to remain consistent with the beacon code.

Laser diodes are well suited for transmitting pulse position modulation signals. They have a high peak power capability, very fast rise times, and operate at their highest power efficiency in pulse mode. The code used for the system of the present invention will consist of a 1 microsecond pulse modulated around a 20 to 50 kilohertz pulse repetition rate. This high pulse repetition rate is possible because the amplitude of each pulse is low, using this technique, a spread ratio or processing gain of 30 to 50 decibels is obtained. This value relates to the ratio of friendly detection range to intercept range. A processing gain of 30 to 50 decibels means that friendly detectors, that is, those with the correct despreading code, can detect the beacon at 33 to 100 times the range at which an enemy can detect it. The use of this LPI spread spectrum signal makes the beacon virtually impossible to detect, jam, or emulate.

The beacon and detector IFF system is highly flexible, allowing the soldier to adapt to changing requirements and conditions. For example, continuous use of the beacon may not be required in a given situation. Tactics, techniques, and procedures of individual military units would dictate when to employ the system as determined by the commander's risk assessment and the tactical situation. Unlike other IFF systems, the beacon of the present invention can be turned off when not appropriate for use, or can be removed from the soldier's web gear and used to mark a building, vehicle, drop zone, or other object. The same basic device can be used to mark both friendly troops and enemy targets, through the use of different coding options. In addition, detectors with larger apertures can be installed on aircraft or armored vehicles, rendering the beacons detectable from ranges of up to several kilometers without increasing beacon transmitted power.

Preferred and alternate embodiments of the present invention have now been described in detail. It is to be noted, however, that this description of these embodiments is merely illustrative of the principles underlying the inventive concept. It is therefore contemplated that various modifications of the disclosed embodiments will, without departing from the spirit and scope of the invention, be apparent to persons skilled in the art.

What is claimed is:

1. An individual beacon identification system comprising:
   a) light emitting means for providing a continuous transmission of a pulse coded optical radiation output signal utilizing a spread spectrum output signal modulated by a spreading code; and
   b) a special purpose detector, placed in a location that is remote from the light emitting means, the detector being adapted for detecting the output signal from the light emitting means and is further adapted to despread the pulse coded optical radiation output signal to allow detection of the pulse coded optical radiation output signal.

2. The individual beacon identification system of claim 1, wherein the light emitting means is smaller than about 35 cubic inches and weighs less than about 3 ounces.

3. The individual beacon identification system of claim 1, wherein the light emitting means includes means for attaching the beacon to a user.

4. The individual beacon identification system of claim 1, wherein the light emitting means further provides a continuously transmitted pulse coded output signal that can be detected by the special purpose detector at a range of up to about 400 meters.

5. The individual beacon identification system of claim 1, wherein the light emitting means further provides a continuously transmitted pulse coded output signal that can be detected by the special purpose detector at a range of at least 400 meters.

6. The individual beacon identification system of claim 1, wherein the light emitting means output signal is detectable by the special purpose detector from any angle.

7. The individual beacon identification system of claim 1, wherein the spreading code is changeable by the user.

8. The individual beacon identification system of claim 7, wherein the light emitting means further comprises a DIP switch and the spreading code is changeable by manipulating the DIP switch.

9. The individual beacon identification system of claim 7, wherein the light emitting means further comprises a memory means and the spreading code is changeable by replacing the memory means.

10. The individual beacon identification system of claim 7, wherein the light emitting means further comprises a memory means and the spreading code is changeable by reprogramming the memory means.

11. The individual beacon identification system of claim 1, wherein the continuously transmitted pulse coded output signal has a wavelength of 1.5 micrometers for allowing detection of the continuously transmitted pulse coded output signal only by the special purpose detector.

12. The individual beacon identification system of claim 1, wherein the light emitting means is attached to shipping containers for identification by a person using the detector.

13. The individual beacon identification system of claim 1, wherein the light emitting means is attached to cargo for identification by a person using the detector.

14. The individual beacon identification system of claim 1, wherein the light emitting means is attached to inventory for identification of particular items by a person using the detector.

15. The individual beacon identification system of claim 1, wherein the light emitting means comprises a laser diode.

16. The individual beacon identification system of claim 1, wherein the special purpose detector further comprises an output means for indicating to a user of the special purpose detector that the continuously transmitted pulse coded output signal provided by the light emitting means has been detected.

17. The individual beacon identification system of claim 16 wherein the output means of the special purpose detector indicates the relative strength of the continuously transmitted pulse coded output signal provided by the light emitting means.

18. The individual beacon identification system of claim 16, wherein the output means of the special purpose detector is selected from the group of output means consisting of tone generators, light emitting diodes, and tactile vibrators.

19. An individual beacon identification system comprising:
   a) a light emitting means for providing a continuously transmitted pulse code modulated optical wavelength output signal; and
   b) a special purpose detector, placed in a location that is remote from the light emitting means, that is adapted for detecting the output signal from the light emitting means;
   c) the light emitting means including means for attaching the beacon to a user;
   d) the light emitting means further providing an output signal that can be detected by the special purpose detector at a range of at least 400 meters;
   e) the light emitting means output signal detectable by the special purpose detector from any angle;
   f) the light emitting means utilizing a spread spectrum output signal modulated by a spreading code;
   g) the spreading code being changeable by the user; and
   h) the special purpose detector further comprises an output means for indicating to a user of the special purpose detector that the continuously transmitted pulse coded output signal provided by the light emitting means has been detected.

20. The individual beacon identification system of claim 19, wherein the light emitting means is smaller than about 35 cubic inches and weighs less than about 3 ounces.

21. The individual beacon identification system of claim 19, wherein the light emitting means further comprises a DIP switch and the spreading code is changeable by manipulating the DIP switch.

22. The individual beacon identification system of claim 19, wherein the light emitting means further comprises a memory means and the spreading code is changeable by replacing the memory means.

23. The individual beacon identification system of claim 19, wherein the light emitting means further comprises a memory means and the spreading code is changeable by reprogramming the memory means.

24. The individual beacon identification system of claim 19, wherein the continuously transmitted pulse coded output signal has a wavelength of 1.5 micrometers for allowing detection of the continuously transmitted pulse coded output signal only by the special purpose detector.

25. The individual beacon identification system of claim 19, wherein the light emitting means comprises a laser diode.

26. The individual beacon identification system of claim 19, wherein the output means of the special purpose detector indicates the relative strength of the continuously transmitted pulse coded output signal provided by the light emitting means.

27. The individual beacon identification system of claim 19, wherein the output means of the special purpose detector is selected from the group of output means consisting of tone generators, light emitting diodes, and tactile vibrators.

28. The individual beacon identification system of claim 19, wherein the light emitting means is attached to shipping containers for identification by a person using the detector.

29. The individual beacon identification system of claim 19, wherein the light emitting means is attached to cargo for identification by a person using the detector.

30. The individual beacon identification system of claim 19, wherein the light emitting means is attached to inventory for identification of particular items by a person using the detector.

* * * * *